United States Patent [19]

Cohen

[11] Patent Number: 4,881,805
[45] Date of Patent: Nov. 21, 1989

[54] PROGRESSIVE INTENSITY PHASE BIFOCAL

[76] Inventor: Allen L. Cohen, 10010 Walsham Ct., Richmond, Va. 23233

[21] Appl. No.: 120,262

[22] Filed: Nov. 12, 1987

[51] Int. Cl.$^4$ .......................... G02C 7/04; G02B 5/18; G02B 27/44; A61F 2/16
[52] U.S. Cl. ............................. 351/161; 350/162.16; 350/162.22; 623/6
[58] Field of Search ............... 351/160 H, 160 R, 161, 351/162; 623/6; 350/162.16, 162.22

[56] References Cited

U.S. PATENT DOCUMENTS

| | | | |
|---|---|---|---|
| 3,309,162 | 3/1967 | Kosanke et al. | 350/162.16 X |
| 3,312,519 | 4/1967 | Max | 350/162.16 X |
| 3,728,009 | 4/1973 | Fedotowsky et al. | 350/162.16 |
| 4,198,132 | 4/1980 | Seger et al. | 351/160 H |
| 4,340,283 | 7/1982 | Cohen | 351/161 |

Primary Examiner—Scott J. Sugarman
Attorney, Agent, or Firm—Finnegan, Henderson, Farabow, Garrett & Dunner

[57] ABSTRACT

An ophthalmic contact lens containing more than one phase plate within its optic zone, including contact lens, especially of a Cohen lens design, which possesses phase plate optics within its optic zone that progressively shift the intensity of light focussed by bifocal phase plates between the diffractive focal powers by utilizing eshelettes in the phase plates of varying depths and heights which are cooperatively aligned relative to the lens base curve surface that they openly face.

17 Claims, 3 Drawing Sheets

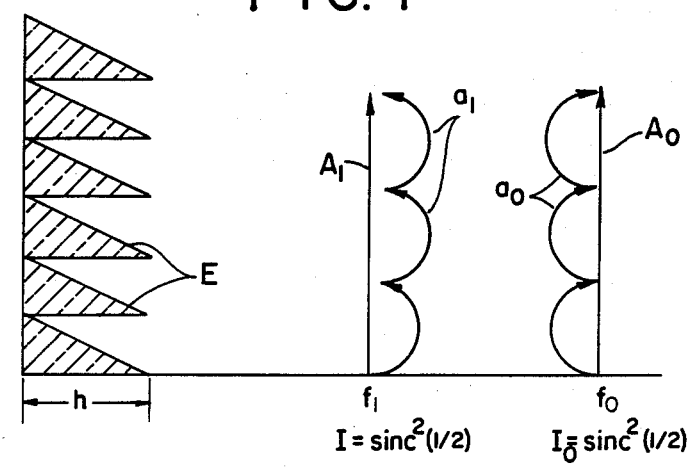
FIG. 1
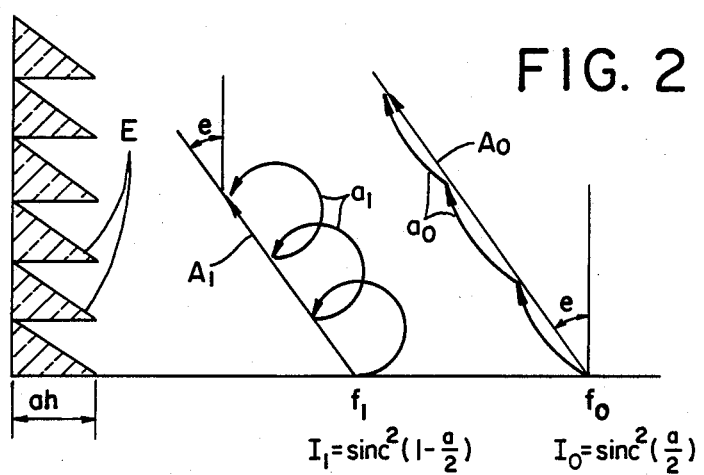
FIG. 2
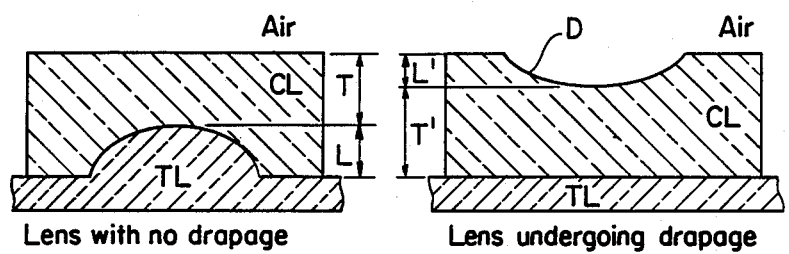
FIG. 5A — Lens with no drapage
FIG. 5B — Lens undergoing drapage

PROGRESSIVE INTENSITY PHASE BIFOCAL

RELATED APPLICATIONS

This application is related to the following commonly assigned applications, filed on even date herewith: Ser. Nos. 120,265 and 120,263 now abandoned.

BRIEF DESCRIPTION OF THE INVENTION

An ophthalmic contact lens containing more than one phase plate within its optic zone.

BACKGROUND TO THE INVENTION

This invention relates to an improvement in phase plate optics embracing contact lenses and intraocular lenses. A "phase plate", as employed herein and in the claims, is a unitary optical region of a lens utilizing the combination of a zone plate and optical facets in the zones said combination diffracts light to produce a specific wavefront which results in a specific intensity distribution of light at the various order (e.g., $0^{th}$, $1^{st}$, etc.) foci of the zone plate.

This invention concerns contact lenses, and more particularly contact lenses utilizing phase plate optics, such as phase plate bifocals and "tuned" Fresnel lenses making use of concentric annular zones. Such lenses generally follow the designs described, for example, by Allen L. Cohen in U.S. Pat. Nos. 5,210,391; 4,338,005; and 4,340,283. The lens design of Cohen, supra, provides that the radii "$r_n$" of the annular and concentric zones are substantially proportional to $\sqrt{n}$ and that the zones are cut so as to direct light to more than one focal point (herein called a "Cohen lens design").

The Cohen lens design with phase plate optics allows lens constructions which are exceptionally thin. Contact lenses may be designed with phase plate optics in order to achieve a bifocal or multifocal effect. The specific chromatic properties of a phase plate may be incorporated in the design of a contact lens including a contact lens having multifocal properties.

There is also the need in multifocal lenses to have the design capability to vary the intensity of light through the lens to accommodate pupil dilation and constriction. It is known that a pupil can vary from 3 to 6 mm. depending upon the level of ambient illumination. It would be desirable to be able to vary the distribution of energy between distance and near focal point according to the users needs. For example, in dim illumination, the user of a contact lens will be typically engaged in distance viewing such in driving of an automobile. It would be desirable to have a contact lens which accommodates that condition. Conversely, a user may seek to have maximum orientation to then ear focus in the lens yet would require a reasonable intensity of light for distance viewing. It would be desirable to have lenses that can be biased to a users requirements or to light intensity.

The nature of the light intensity problem is illustrated by reference to FIGS. 1 and 2. The lens portion depicted in FIG. 1 is a cross-sectional side view of a portion of a half-wave bifocal phase plate with the echelettes depths h given by the equation:

$$h = w/2(n' - n)$$

where:
w = wavelength of light
n' = refractive index of the contact lens
n = refractive index of tear layer of eye In FIG. 1 the individual amplitudes of light $a_0$ and $a_1$ are formed by the individual echelettes E. The total resultant amplitudes of light $A_0$ and $A_1$ formed at the $0^{th}$ and $1^{st}$ diffractive foci are also shown in FIG. 1. In this illustration, the parallel nature of vectors $a_0$ and $a_1$ demonstrates that the intensity of light is split equally between the two focal points. The intensities at the $0^{th}$ order and the $1^{st}$ order diffractive foci are given by:

$$I_o = \text{sinc}^2(\tfrac{1}{2}) \quad [\text{Intensity at } 0^{th} \text{ order diffractive focus}]$$

$$I_1 = \text{sinc}^2(\tfrac{1}{2}) \quad [\text{Intensity at } 1^{st} \text{ order diffractive focus}]$$

It is not necessary for a bifocal phase plate to split the incident light equally between its two diffractive foci when the vectors $a_0$ and $a_1$ are in parallel. This is shown in FIG. 2 where the cross-section of a portion of a bifocal phase plate shows the echelette depths d which are given by the formula:

$$d = a.h \text{ where}$$

$$h = w/2(n' - n)$$

$$0 < a < 2$$

In the case of the FIG. 2 illustration, the intensity of light is not split equally between the two focal points. The intensities at the $0^{th}$ order and $1^{st}$ order diffractive foci of this example are derived from the following equations:

$$I_o = \text{sinc}^2(a/2) \quad [\text{Intensity at } 0^{th} \text{ order diffractive focus}]$$

$$I_1 = \text{sinc}^2(1 - a/2) \quad [\text{Intensity at } 1^{st} \text{ order diffractive focus}]$$

In this case, the amplitudes of light $A_o$ and $A_1$ are shifted in phase to parallel non-vertical aligned amplitudes produced by a half-wave bifocal phase plate. The phase shift e is derived from the equation:

$$e = 1 - a)\pi/2$$

Though the current developments are significant improvements in the art, there is always a need to improve on the adaptability of the lenses of pupil-diameter variations and decentration. It is desirable to provide bifocal performance of a lens of the Cohen design with the feature that it can shift focussed light from distance to near in coordination with the human eye's pupil, which normally constricts during near viewing.

It has been determined that contact lenses with phase plate optics may generate a few problems for the wearer. One is the glare that results from the non-optical edges of the step between the annularly arranged echelettes that make up a phase plate and appears through wave interference as a disconcerting, intense light to the contact lens user.

Another potential problem stems from (i) the need in soft contact lenses to have sufficient mobility in the lens' fit to the cornea to allow tear fluid exchange to cleanse the surface of the eye of metabolic waste and (ii) the inability of the soft lens to move sufficiently during wearing to satisfy that needed mobility.

The provision of a multiplicity of multifocal Fresnel echelettes in the annular zone plate arrangement of the Cohen lens design in a soft contact lens tends to limit the mobility of the lens. It would be desirable to incorporate into the design of such lenses sufficient mobility that the lens has the capacity of moving about 0.5 to about 1 millimeter of distance during wearing. This would enhance the lens' ability to allow management of the buildup of metabolic waste under the lens.

It is another feature of this invention, amongst other things, to provide a multifocal contact lens design encompassed within the annular arrangement of the Cohen patents, supra, which minimizes the effects of glare from the non-optical edges and/or possesses the requisite mobility during use, as characterized above.

THE INVENTION

This invention relates to opthalmic lenses such as contact and intraocular lenses containing more than one phase plate within their optic zones. A preferred aspect of the invention is directed to an ophthalmic contact lens containing at least two phase plates within its optic zone. The invention contemplates the creation of a resultant wavefront derived from the contribution through interference of the wavefronts emanating from each phase plate.

In another aspect, this invention relates to a contact lens which possesses phase plate optics within its optic zone that progressively shift the intensity of light focussed by bifocal phase plates between the diffractive focal powers by utilizing echelettes in the phase plates of varying depths and heights which are cooperatively aligned relative to the lens base curve surface that they opening face.

In a preferred embodiment of such aspect, the invention relates to a lens of the Cohen lens design in which progressive shifting of the intensity of light focussed by the bifocal plate is between the diffractive focal powers effected through echelettes in the phase plate of varying depths and heights which are cooperatively aligned relative to the lens base curve surface that they openly face.

In a further preferred embodiment of the invention, the median of the height of at least a predominant number of the echelettes (of a Fresnel-type configuration) of a bifocal phase plate lens fall essentially on the same imaginary curved or straight plane within the lens, the points of which are essentially equidistant on a perpendicular straight line from the cornea. In the context of the above, a draped bifocal phase plate lens is a lens on the cornea draped to the extent that the lens is capable of draping within its intended use range. In a more preferred embodiment, essentially all, most preferably all, of the echelettes fall essentially on the same imaginary curved or straight plane within the lens, the points of which are essentially equidistant on a perpendicular straight line from the cornea.

BRIEF DESCRIPTION OF THE DRAWINGS

FIG. 1 illustrates a cross-sectional side view of a portion of a half-wave bifocal phase plate with echelettes E formed to the depth h. It characterizes the individual amplitudes of light $a_o$ and $a_1$ formed by the individual echelettes E. The vector analysis depicts the total resultant amplitudes of light $A_o$ and $A_1$ formed at the $0^{th}$ and $1^{st}$ diffractive foci.

FIG. 2 illustrates a cross-sectional side view of a portion of a bifocal phase plate with echelette E formed to the depth ah. It characterizes the individual amplitudes of light $a_o$ and $a_1$ formed by the individual echelettes E. The vector analysis depicts the total resultant amplitudes of light $A_o$ and $A_1$ formed at the $0^{th}$ and $1^{st}$ diffractive foci.

FIG. 5 illustrates a cross-sectional side views of a soft contact lens CL resting upon a tear layer TL demonstrating, as noted, a tear lens without drapage and an air lens formed by the dimpled surface D when drapage occurs.

DETAILS OF THE INVENTION

The bifocal performance of the lens of this invention stems from the feature that it can shift focussed light from distance to near in coordination with the human eye's pupil, which normally constricts during near viewing. The lens can reduce the level of glare by reducing echelette depth at the lens periphery, and thereby reducing the non-refracting area of these echelettes.

The invention comprises a contact lens of a Cohen lens design with an optic zone formed as a composite of more than one phase plate of different dimensions, preferably two or more different phase plates of different dimensions. Apart from Cohen, supra, there are no guiding principles in the art for incorporating multiple phase plates within the optic zone of a multifocal contact lens. Even though it may seem apparent that the phase relationship between the separately focussed portions of light has to be considered in effecting such a incorporation, the art is devoid of suggestions as to how to form a composite lens in a manner such that the various phase plates will interact in a functionally acceptable fashion to overcome the problems cited above.

It has been determined that each phase plate should obey a common phase plate formula in order to have them all contribute light to the same foci. The radii relationship of the phase plate zones follows the characterizations of the Cohen lens design, to wit:

$$r_m \sqrt{2\,m\,w\,f}$$

w = the wavelength of light
w = wavelength of light
f = focal length of $1^{st}$ order diffraction.

but with w and f identical for all of the phase plates. Specifically, the position of the $m^{th}$ zone of the composite lens depends on a single formula for $r_m$, independent of the phase plate to which the zone belongs.

It would be advantageous if the separate phase plates of a Cohen lens design or a separate phase plate plus part of another phase plate contributed light aligned in phase. One way to accomplish this is to have each phase plate associated with a phase channel that introduces a constant phase shift to correct to the phase shift e, observed in FIG. 2.

Figure 3:
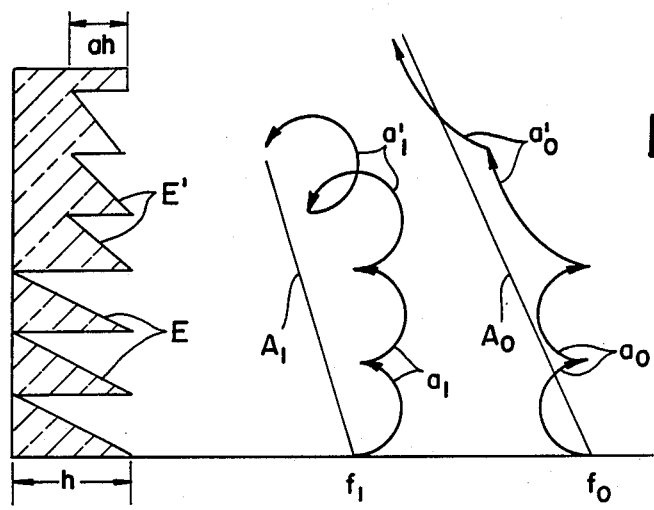
FIG. 3 illustrates a cross-sectional side view of a portion of a bifocal lens consisting of two separate phase plates with echelettes E and E' formed to the depths h and ah, respectively. It characterizes the individual amplitudes of light $A_o$ and $A'_o$ formed at the $0^{th}$ diffractive focus and the total resultant amplitudes of light $A_1$ and $A'_1$ formed at the $0^{th}$ diffractive focus and the total resultant amplitudes of light $A_{1\ l\ and\ A'_1}$ formed at the $1^{st}$ diffractive focus.

The FIG. 3 bifocal contact lens has an optic zone which contains two separate phase plates. In that characterization, all of the zones are positioned according to a single phase plate spacing as mentioned above to be desirable. However, the characterization fails to account for the phase shift that occurs at the transition between the phase plates. Therefore, FIG. 3 demonstrates that the individual amplitudes of light $a_o$ and $a'_o$ formed by the echelettes E and E' of the two phase plates are not in phase. As a result, the total resultant amplitude of light $A_o$, formed at the $0^{th}$ diffractive focus, is diminished from its maximum possible magnitude. The same situation occurs at the $1^{st}$ diffractive focus.

Figure 4:
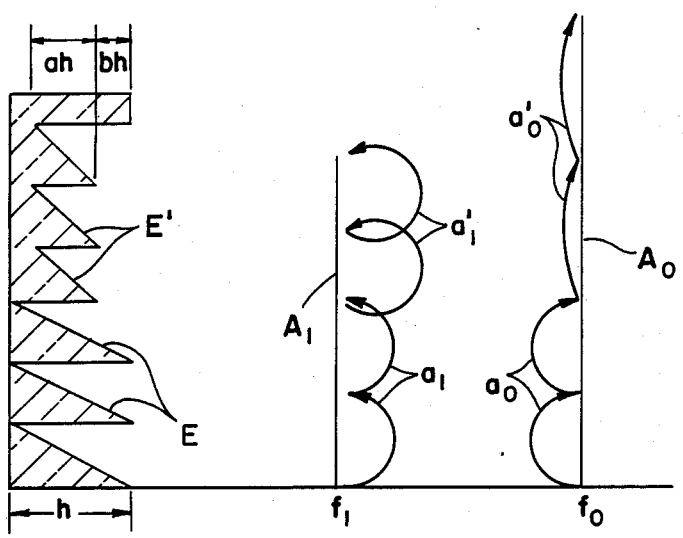
FIG. 4 illustrates a cross-sectional side view of a portion of a bifocal lens consisting of two separate phase plates and a phase channel of depth bh. It characterizes the individual amplitudes of light $a_o$ and $a'_o$ formed by the individual echelettes E and E' of the separate phase plates. It shows the total resultant amplitudes $A_o$ and $A'_o$ formed at the $0^{th}$ diffractive focus and the total resultant amplitudes $A_1$ and $A'_1$ formed at the $1^{st}$ diffractive focus.

FIG. 4 also depicts a bifocal contact lens having an optical zone containing two separate phase plates. However, in this case, a channel of depth bh is provided to bring the phases of light into alignment. The depth is determined from the formula:

$$b = bh$$

$$a = ah$$

Because of this channel, the total resultant amplitudes of light $A_o$ and $A_1$ formed at the $0^{th}$ and $1^{st}$ diffractive foci achieve their maximum possible magnitude. It should be noticed that setting the channels at a depth d as described above is equivalent to requiring that the line through the centers of all of the resulting echelettes, essentially parallels the base curve and is set back from the base curve by one-half the depth of the deepest echelette.

Soft contact lenses usually incorporate the phenomenon of draping. It is generally assumed and expected that a soft contact lens will drape upon and take the shape and form of the surface of the eye upon which it is fitted. FIGS. 5A and B illustrate a soft contact lens designed to have a center thickness T and a tear layer thickness L. However, because of drapage, it must be redesigned with a center thickness T' in order to account for the absence of the tear layer and the addition of an air lens formed by the depression D in the contact lens surface. Thus, incorporating these factors into the standard contact lens formulas for drapage, there is obtained the expression:

$$T' = T + L(n-1)/(i\,n'-1).$$

Figure 6:
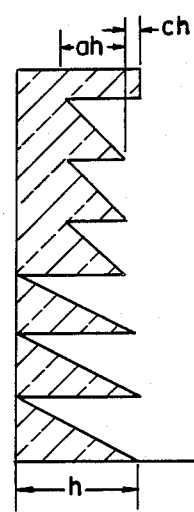
FIG. 6 illustrates a cross-sectional side view of a portion of a bifocal lens containing two separate phase plates with echelette depths of h and ah, respectively, and a phase channel of depth ch.

A soft contact lens designed as a composite of different phase plates, each with an associated channel, will allow the phase channels to smoothly drape upon the eye simply by adjusting the phase channel depths to compensate for drapage. Reference is made to the teachings of copending application Ser. No. 120,165 about the role and function of phase channels. The lens shown in FIG. 6 with a phase channel of depth ch above the base curve of the lens, c is determined by the equation:

$$c = b'h'(n'-n)/(n-1).$$

Figure 7:
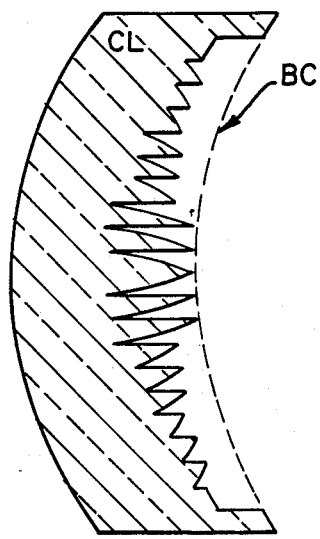
FIG. 7 illustrates a cross-sectional side view of a contact lens CL designed with base curve BC. This lens contains three separate phase plates each comprising three echelettes cut to a specific depth. The outer two phase plates are set back from the base curve of the lens to form phase shifting channels that are compensated to allow the lens to drape to the base curve according to the invention.

The embodiment of the invention shown in FIG. 7 encompasses a contact lens CL having a posterior surface matched to a base curve BC. Cut into the base curve centrally is a half wave phase plate with three annular zones of echelettes which are one-half wavelength deep. Cut into the intermediate portion of the base curve is another phase plate with three annular zones. The echelettes of this phase plate are of slightly less depth and are set slightly back from the base curve of the lens. The outermost portion of the base curve is cut with still another three annular zone phase plate. The echelette depths of this most peripheral phase plate are the shallowest and most set back from the base curve. According to this invention, the line through the centers of all of the echelettes parallels the base curve and is set back from the base curve by a quarter-wave.

Figure 8:
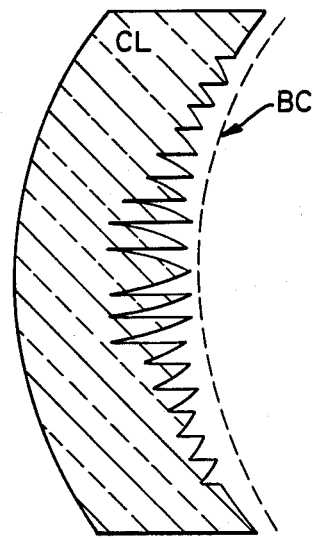
FIG. 8 illustrates a cross-sectional side view of a contact lens CL designed with base curve BC. This lens contains three separate phase plates each comprising three echelettes cut to a specific depth. The outer two phase plates are set back from the base curve of the lens to form phase shifting channels that are compensated to allow the lens to drape to the base curve according to the invention.

The embodiment of the invention shown in FIG. 8 depicts a contact lens CL having a posterior surface matched to a base curve BC. This lens comprises three separate annular phase plates each containing three annular echelettes cut to a specific depth. In this lens, the outer two phase plates are set back from the base curve of the lens to form phase shifting channels that are compensated to allow the lens to drape to the base curve according to the invention. Hence, the line through the centers of all of the echelettes in this lens does not parallel the base curve, but rather is steeper until the lens is placed on the eye and allowed to drape. Then the centers will essentially parallel the base curve.

Figure 9:
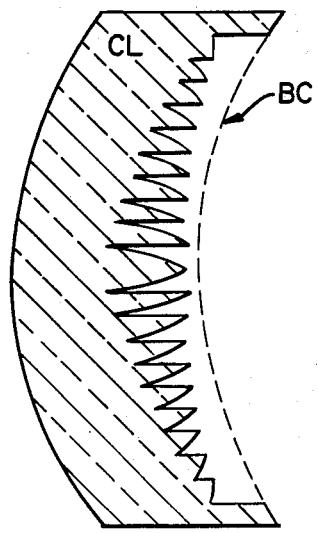
FIG. 9 illustrates a cross-sectional side view of a contact lens CL designed with a base curve BC. This lens contains a composite of phase plates with echelettes of continuously varying depths. The outer echelettes are the shallowest and are set back increasingly from the base curve of the lens to form phase shifting channels according to the invention.

The embodiment of the invention shown in FIG. 9 is a contact lens CL designed with a base curve BC. This lens contains a composite of phase plates with echelettes of continuously varying depths. The outer echelettes are the shallowest and are set back increasingly from the base curve of the lens to form phase shifting channels according to the invention. The peripheral portion of the lens is cut back from the base curve at least to the point where it lays tangent to the outermost echelettes so as to allow for full drapage of the contact lens. Again, in accordance with this invention, the line through the centers of all of the echelettes will parallel the base curve. In this embodiment, the echelettes depths are monotonically decreasing from the lens center outward.

Figure 10:
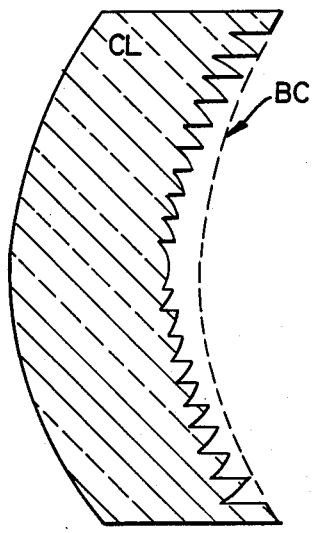
FIG. 10 illustrates a cross-sectional side view of a contact lens CL designed with a base curve BC. This lens contains a composite of phase plates with echelettes of continuously varying depths. The outer echelettes are the deepest and are set back from the base curve of the lens sufficient to allow the lens to drape to the base curve according to the invention.

The embodiment of the invention shown in FIG. 10 is a contact lens CL designed with a base curve BC and containing a composite of phase plates with eshelettes of continuously varying depths. In this case, the outer echelettes are the deepest and are set back from the base curve of the lens to only that amount to allow the lens to drape to the base curve according to the invention. In this embodiment, the echelette depths are monotonically increasing from the lens center outward. In this case a line through the centers of all of the echelettes will be flatter than the base curve of the lens until it is draped over the eye.

A desirable lens encompassed by this invention has an optic zone of about 6 to about 8 millimeters comprising a concentric phase plate of about 4 to about 5 millimeters in diameter, viz., about 4.5 millimeters in diameter, and an annular channel having a width of about 0.5 to about 2.0 millimeters.

In those situations where the degree of mobility of the lens is extreme but the level of glare reduction achieved by the practice of the invention is considered most desirable, the lens may be modified by inclusion of the keel construction described in commonly assigned copending application Ser. No. 120,263 now abandoned, filed on even date herewith, to decrease the level of mobility yet retain the advantages of the invention.

The lens of the invention may be made conventional processes in the art. For example, anhydrous versions of the base phase of a soft contact lens may be ground to provide the lens structures of the invention. Lenses may be casted from molds replicating the lens structures of the invention. The lenses may be made of glass and the conventional plastics used for making contact lenses.

I claim:

1. An ophthalmic contact or intraocular lens containing more than one phase plate within its optic zone.

2. The ophthalmic contact or intraocular lens of claim 1 wherein there are at least two phase plates within the optic zone.

3. The ophthalmic contact or intraocular lens of claim 1 wherein each phase plate obeys the same phase plate formula.

4. The ophthalmic contact or intraocular lens of claim 3 wherein the formula is:

$$r_m = \sqrt{2\,m\,w\,f}$$

w = the wavelength of light
f = focal length of 1$^{st}$ order diffraction.

5. The ophthalmic contact or intraocular lens of claim 1 in which the lens possesses phase plate optics within its optic zone that progressively shift the intensity of light focussed by bifocal phase plates between the diffractive focal powers by utilizing echelettes in the phase plates of varying depths and heights which are cooperatively aligned relative to the lens base curve surface that they openly face.

6. The ophthalmic contact or intraocular lens of claim 5 in which the lens is of a Cohen lens design.

7. The ophthalmic contact or intraocular lens of claim 6 in which each of the individual phase plates obeys the same phase plate formula.

8. The ophthalmic contact or intraocular lens of claim 7 wherein the formula is:

$$r_m = \sqrt{2\,m\,w\,f}$$

w = the wavelength of light
f = focal length of 1$^{st}$ order diffraction.

9. The ophthalmic contact or intraocular lens of claim 8 wherein the echelette depths are monotonically increasing from the lens center outward.

10. The ophthalmic contact or intraocular lens of claim 8 wherein the echelette depths are monotonically decreasing from the lens center outward.

11. The ophthalmic contact or intraocular lens of claim 6 wherein each echelette is set back from the base curve according to its specific depth.

12. The ophthalmic contact or intraocular lens of claim 6 wherein the deepest echelettes have a depth h and are placed to touch the base curve of the lens, and each echelette of a differing depth ah are set back a distance b = (1−a)/2 from the base curve.

13. The ophthalmic contact or intraocular lens of claim 11 wherein the echelette depths are monotonically increasing from the lens center outward.

14. The ophthalmic contact or intraocular lens of claim 11 wherein each echelette is set back from the base curve according to its specific depth in such a manner that allows for drapage of the lens.

15. The ophthalmic contact or intraocular lens of claim 14 wherein the deepest echelettes have a depth h and are placed to touch the base curve of the lens, other echelette of a differing depth ah are set back a distance c from the base curve where c is given by the formula c = bh(n'−n)/(n−1), with n' equal to the refractive index of the contact lens and n equal to the refractive index of tear layer of the eye.

16. The ophthalmic contact or intraocular lens of claim 14 wherein the echelette depths are monotonically increasing from the lens center outward.

17. The ophthalmic contact or intraocular lens of claim 14 wherein the echelette depths are monotonically decreasing from the lens center outward and where the peripheral portion of the lens is cut back from the base curve at least to the point where it lays tangent to the outermost echelettes so as to allow for full drapage of the contact lens.

* * * * *